April 22, 1930.  A. E. SPINASSE  1,755,523
APPARATUS AND METHOD FOR DRAWING GLASS
Filed July 5, 1927   2 Sheets-Sheet 2

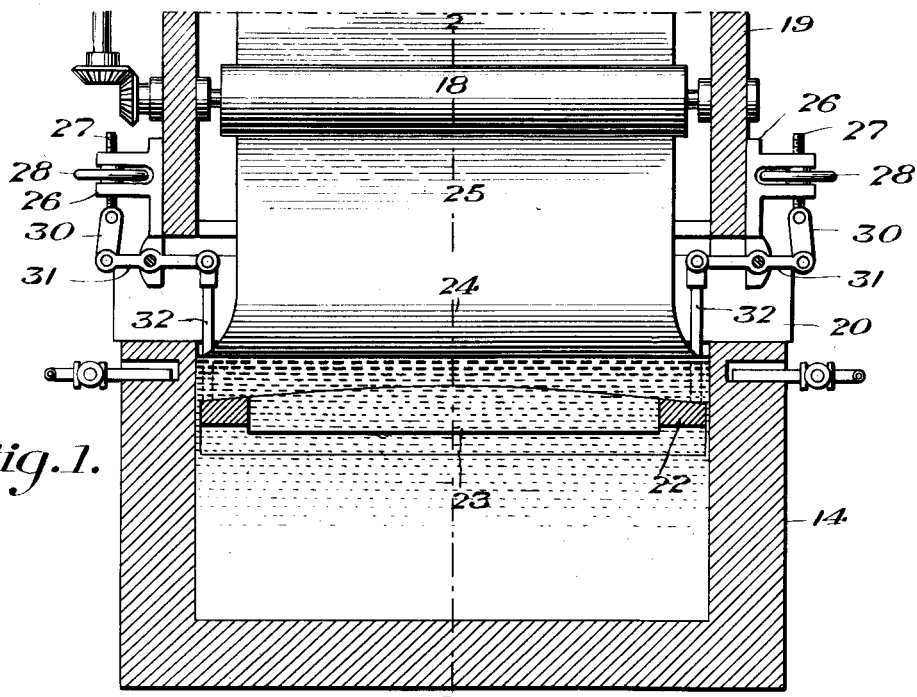
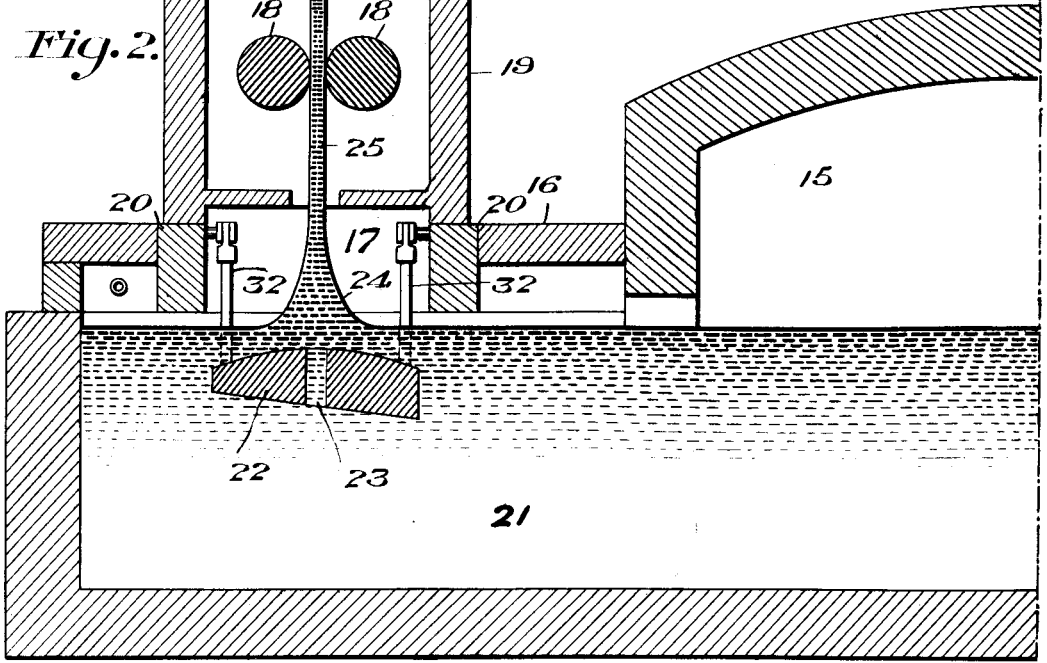

Inventor
By Arthur E. Spinasse

Patented Apr. 22, 1930

1,755,523

UNITED STATES PATENT OFFICE

ARTHUR E. SPINASSE, OF MOUNT VERNON, OHIO

APPARATUS AND METHOD FOR DRAWING GLASS

Application filed July 5, 1927. Serial No. 203,488.

The present invention relates to improvements in the art of drawing continuous sheet glass from a bath of molten glass, and has for its primary object the arrangement of parts to prevent the crystallization of glass at the surface of the bath in proximity to the source of the sheet or plate glass being drawn. Also the improvement of means and method for supplying a cooled portion of anchored glass of substantially uniform viscosity throughout from which a flat sheet of glass may be drawn freer or devoid of wavy defects, lines or similar blemishes.

I have already disclosed in my Patent No. 1,336,056, granted to me April 6, 1920, in Figure 20 of the drawing of said patent a form of wedge slab submerged within the bath beneath the source of the article being drawn, but with a flat upper surface. I have improved upon this structure to the extent of better controlling and regulating the temperature and viscosity of the molten glass which passes over and about or through the slab.

Another object of the invention is to provide an improved anchorage and insure uniformity in the thickness of the article or sheet glass being drawn.

The above and various other objects and advantages of this invention will be described in and understood from the following detailed description of the present preferred embodiments thereof and the improved method or process of practicing the invention, the embodiments being illustrated in the accompanying drawings, wherein:—

Figure 1 is a transverse section taken through a forehearth of a glass furnace at the line of the draw, showing the improvement of this invention mounted therein and in relation to a sheet of glass being drawn.

Figure 2 is a longitudinal section taken substantially on the line 2—2 of Figure 1, and showing the melting tank in communication with the drawing forehearth.

Figure 3 is a detail front edge view of the cooling and anchoring slab employed.

Figure 4:
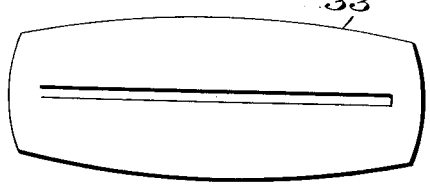
Figure 4 is a top plan view of a modified form of the slab.

Referring to Figures 1 to 3 of the drawings, 15 designates a glass melting tank in communication with the forehearth 16, the roof of which has an elongated drawing opening 17 transversely thereof, and above which is disposed the sheet drawing means within the leer 19. Shields 20 are disposed spaced just above the surface of the bath 21 at the opposite side of opening 17.

It will be understood, in a furnace of this type, that the glass bath will be maintained at the customary substantially constant or uniform level.

Located in the bath 21 is a slab 22 which in the present instance is shown as of oblong or rectangular shape, and which may or may not be provided with a central opening 23 extending vertically throughout the height of the slab and longitudinally throughout substantially the length of the slab. Such an opening when used, assists in commingling the different portions of the glass which pass therethrough to the source of the drawn sheet.

The slab in cross section, as shown in Figure 2, may have a general wedge shape configuration and is adapted to be placed in the forehearth or tank 16 with the thinner edge toward the front part thereof where the glass tends to be slightly cooler than on the side of the melting tank 15.

In order to gradually and uniformly control the cooling of the molten glass flowing about and over the upper surface of the slab as the glass merges into the meniscus 24 of the sheet of glass 25 being drawn, the upper surface of the slab 22 is made convex in both longitudinal and transverse directions to provide an upper surface of substantially slightly spherical shape. The curvature of the upper surface of the slab 22 extends to the edges thereof and may be of desired degree to provide a smooth and uninterrupted symmetrical surface to effect the gradual and uniform cooling and anchoring of the layer of molten glass as it enters the anchoring area and gradually merges into the meniscus forming the sheet.

By the provision of the upper convex surface of the slab 22, the depth of the surface layer of the molten glass increases toward the ends and sides of the base of the meniscus to prevent or minimize the formation of areas of cooler glass at the edge portions of the meniscus. The slab 22 is maintained in a totally submerged position in the bath 21 by any suitable means, such as the means illustrated. In Figures 1 and 2 the end walls of the leer 19 are utilized for supporting brackets 26, and each bracket 26 has mounted therein a vertically slidable shaft 27 upon which is threaded a hand wheel 28 held against vertical movement by arms of the bracket. The shaft 27 is connected by a pivoted link 30 to an arm 31 pivoted in the lower end of the bracket 26 and projecting through the walls of the leer 19. Pivotally suspended upon the inner end of the arm 31 is a refractory rod 32 adapted at its lower end to bear against the upper surface of the submerged slab 22.

The slab adjusting devices may be disposed not only at each end of the slab but also at opposite corners thereof, as shown in Figure 2, so that the slab may be adjusted to any desired position or depth entirely submerged beneath the surface level of the bath. This adjustment of the slab 22 permits the desired free surface layer flow of the molten glass from the forehearth 16 over the upper surface of the slab 22 and beneath the shields 20 to the source or meniscus 24 of the sheet of glass 25 being drawn; thereby minimizing the tendency to the divitrification of the glass at the drawing area.

The slab 22 is submerged to a greater or less extent in the bath to regulate the gather of the meniscus of the sheet. The slab 22 is positioned to form a relatively shallow layer of cooler glass above the upper surface of the slab adjacent the meniscus. If the relatively thin layer produces imperfections in the drawn sheet, the slab 22 may be further submerged.

The lateral dimension of the slab 22 is such that it extends at opposite sides beyond the lateral base edges of the meniscus for conditioning the surface layer gradually and evenly, in both directions, as it travels toward the meniscus of the glass article or sheet being drawn. In drawing the glass sheet the slab is submerged beneath the meniscus in register centrally therewith and in such position that the surface layer is gradually and uniformly cooled to the correct viscosity throughout its path of travel.

As shown in Fig. 2, the meniscus 24 is drawn from the free surface of the bath and from the shallow layer of glass above the segregating member 22, and with the inner longitudinal portion of the base of the meniscus taking form above a portion of the deep bath in line with the slot 23. The fact that the segregated layer is entirely free at its sides and the molten glass of the bath being free to move through the slot, and at least one of the upper or lower surfaces of the segregating member being longitudinally convex or longitudinally and transversely convex, a better regulation of the glass supply to the sheet source is maintained and greater uniformity of thickness in the sheet secured as the opposite sides of the meniscus move upwardly in closer relation to form the final sheet.

The slab 22 may be tilted more or less so as to depress its front or rear edge to equalize the surface tension at each side of the meniscus to maintain the same in desired central position in the draw opening 17, and above passage 23 in the slab.

Figure 6:
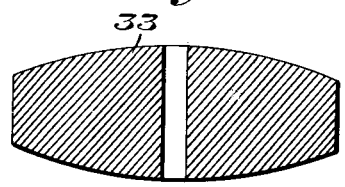
Figure 6 is a transverse section thereof.
Figure 5:
Figure 5 is a central longitudinal section through the same.

The slab may be modified as shown in Figures 4, 5 and 6. In this form the slab 33 has upper and lower convex faces which are curved both longitudinally and transversely, and which also has a convex lateral face which extends from the end edges of the body 33. With this structure the slab 33 increases in all dimensions from the outer edges to the middle portion of the slab.

Figure 7:
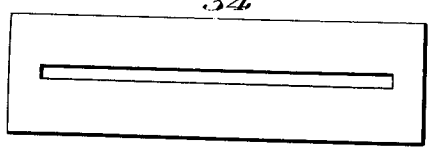
Figure 7 is a top plan view of another modified form of the slab.
Figure 9:
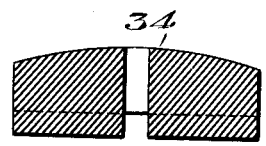
Figure 9 is a transverse section through the same.
Figure 8:
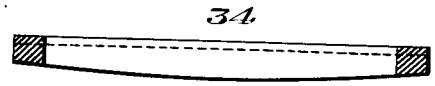
Figure 8 is a longitudinal section therethrough.

Figures 7, 8 and 9 disclose another modification of the slab 34. In this form the upper surface of the slab is transversely convex while the lower surface thereof is longitudinally convex.

Figure 10:
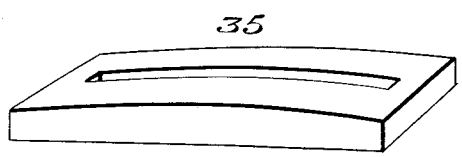
Figure 10 is a perspective view of a further modified form of the slab.
Figure 11:
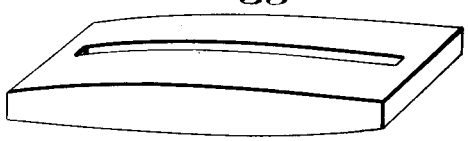
Figure 11 is another perspective view of a still further modified form of the slab.

In Figure 10 the slab has its upper surface longitudinally convex, and in Figure 11, the slab 36 is shown with both its upper and lower surfaces longitudinally convex.

The various modified forms of the slab shown in Figures 4 to 11, both inclusive, may be inverted should the surface in use thereof become pitted or otherwise impaired, and thereby the usefulness of the slab is greatly increased.

It is obvious that various changes and modifications may be made in the details of construction and design of the above specifically described embodiment of this invention without departing from the spirit thereof, such changes and modifications being restricted only by the scope of the following claims.

What is claimed is:—

1. An anchoring and temperature controlling slab for use in drawing articles or sheets of glass, comprising an oblong solid body portion adapted for complete submersion in a bath of molten glass and immediately beneath the meniscus of the article or sheet being drawn, said body having a transverse wedge shape and provided with an upper surface convex in both longitudinal and transverse directions.

2. An anchoring and temperature controlling slab for use in drawing articles or sheets of glass comprising a solid body adapted to be submerged in a bath of molten glass beneath the meniscus of an article or sheet to be drawn, said body having a substantially convex in both directions upper face gradually and uniformly receding from the meniscus from the intermediate portion thereof to the ends and sides of the meniscus.

3. In apparatus for drawing articles or sheets of glass, a forehearth adapted to receive molten glass connected to a melting tank, a slab of oblong contour adapted to be submerged beneath the meniscus of the article or sheet being drawn from the glass in said forehearth, said slab in transverse cross section being of substantially wedge shape and adapted to be placed in the bath with the thinner side thereof toward the front of said forehearth, said slab also having a uniformly increasing thickness, relatively to the wedge shape, from the front and rear sides thereof to the intermediate portion of the body.

4. An anchoring and temperature controlling slab for use in drawing articles or sheets of glass, comprising a solid body adapted to be submerged in a bath of molten glass beneath the meniscus of an article or sheet to be drawn, said body in longitudinal and transverse cross section increasing gradually in thickness between its upper and lower faces from its perimeter to its middle portion.

5. An anchoring and temperature controlling slab for use in drawing articles or sheets of glass, comprising a solid body adapted to be submerged in a bath of molten glass beneath the meniscus of an article or sheet to be drawn, said body having a substantially convex surface increasing the dimension of the body gradually from the edges toward the intermediate portion of the body.

6. In the process of drawing sheet glass from a deep bath of molten glass, segregating a long narrow layer of glass entirely free at its sides from a point within the glass bath, drawing the sheet upwardly from said layer of glass and from the free surface level of the bath, and retarding the transmission of heat from the lower mass of the glass bath gradually and uniformly less from the middle towards the end and side portions of the meniscus of the sheet.

7. In the process of drawing sheet glass from a deep bath of molten glass, segregating a long narrow layer of glass entirely free at its sides from a point within the glass bath, and with the segregated layer increasing in depth gradually and uniformly from the middle towards the end portions of the layer, and drawing the sheet upwardly from said layer of glass and from the free surface of the bath.

8. An anchoring and temperature controlling slab for use in drawing articles or sheets of glass, comprising a solid body adapted to be submerged in a bath of molten glass beneath the meniscus of an article or sheet to be drawn, said body having at least one convex surface, gradually and uniformly increasing the thickness of the body from the edges to the middle portion thereof.

9. An anchoring and temperature controlling slab for use in drawing articles or sheets of glass, comprising a solid body adapted to be submerged in a bath of molten glass beneath the meniscus of an article or sheet to be drawn, said body having an upper convex surface curved gradually and uniformly from end to end of the body.

10. An anchoring and temperature controlling slab for use in drawing articles or sheets of glass, comprising a solid body adapted to be submerged in a bath of molten glass beneath the meniscus of an article or sheet to be drawn, said body having upper and lower convex surfaces extending in the same general direction from end to end of the body.

11. In the process of drawing sheet glass from a deep bath of molten glass, segregating a long narrow layer of glass entirely free at its sides from a point within the glass bath, and with the segregated layer increasing in depth gradually and uniformly from the middle to the end and side portions of the layer, and drawing the sheet upwardly from said layer of glass and from the free surface of the bath.

12. In the process of drawing sheet glass from a deep bath of molten glass, segregating a long shallow layer of glass entirely free at its sides from a point within the glass bath, and with the segregated layer increasing in depth gradually and uniformly from the middle towards the end portions of the layer, and drawing the sheet from the free surface of the bath with the side portions of the meniscus in line with and above the shallow layer of glass and the inner longitudinal portion of the meniscus above a deep portion of the glass bath.

13. An anchoring device for use in drawing sheet glass from a deep open bath of molten glass, said device comprising a long narrow body adapted to be wholly submerged within the bath in line beneath the meniscus of the sheet to be drawn, said body having upper and lower faces, at least one of said faces being longitudinally convex and curving gradually from the middle towards the end portions of the body, and means for drawing the sheet from the portion of the glass lying above said body.

14. An apparatus for drawing sheet glass from an open bath of molten glass at a predetermined level including an anchoring device, said device comprising a long narrow refractory body having a narrow glass admitting slot opening through the top and bottom of the body, said body having upper and lower faces, at least one of said faces being longitudinally convex and curving gradually from the middle towards the end portions of the body, means for maintaining said body in desired submerged position with the entire upper surface thereof spaced below the surface level of the glass bath to form an upper layer of glass in line beneath the meniscus of the sheet to be drawn, and means for drawing the sheet from the open bath with the base of the sheet in line with said slot and layer of glass.

15. An apparatus for drawing sheet glass including a tank for containing an open bath of molten glass at a predetermined level, an anchoring device comprising a long narrow slab of transverse tapering shape having a narrow glass admitting slot extending substantially throughout the length thereof, said slab having upper and lower faces, at least one of said faces being longitudinally convex and curving gradually from the middle towards the end portions of the slab, means for holding the slab submerged within the bath transversely of the tank and with its upper surface wholly spaced below the surface level of the bath beneath and in line with the base of the sheet glass to be drawn, and means for drawing the sheet from the open bath with the base of the sheet in line with said slot and shallow portion of glass lying above the submerged slab.

16. In the process of drawing sheet glass from a bath of molten glass, segregating a layer of glass entirely free at its sides from a point within the glass bath, drawing the sheet upwardly from said layer of glass and from the free surface level of the bath, and retarding the transmission of heat from the lower layers to the top layer of glass gradually and uniformly less from the middle to the extreme end portions of the meniscus of the sheet.

17. In combination with apparatus for drawing sheet glass, a glass melting tank and a forehearth in free communication therewith for containing a bath of molten glass, said forehearth having front and side walls including spaced apart shielding members supported wholly spaced above the surface level of the bath to form a cooler area of glass in the bath lying therebetween from which the sheet may be drawn, a rectangular slab having its upper surface downwardly curved gradually and uniformly from its middle to the extreme end portions thereof, and means for adjustably holding said slab wholly submerged in spaced relation beneath the meniscus of the sheet being drawn from said area with the end portions of the slab in position adjacent to the side walls of the forehearth and submerged at a lower level within the path than the middle portion thereof.

In testimony whereof I affix my signature.

ARTHUR E. SPINASSE.